3,226,350
PREPARATION OF HIGH SOLIDS VINYL CHLO-
RIDE POLYMER LATEX
Edwin Studly Smith, Cuyahoga Falls, and James E. Sell,
  Akron, Ohio, assignors to The Goodyear Tire & Rubber
  Company, Akron, Ohio, a corporation of Ohio
No Drawing. Filed July 23, 1962, Ser. No. 211,888
            7 Claims. (Cl. 260—29.6)

This is a continuation-in-part application of my application Serial Number 807,971 filed April 9, 1959, now abandoned.

This invention relates to improvements in the emulsion polymerization of polymerizable unsaturated monomers and particularly in the preparation of vinyl chloride polymer latices having a relatively high solids content of at least 50% and as high as 70% by weight and having a relatively low viscosity of about 2,000 cps. or less.

It is well known that the maximum packing of polyvinyl chloride particles all of a given size will permit the solids content in an aqueous system to reach about 79% by weight. However, the viscosity of such a system even having a solids content of 60% by weight increases abruptly when such a system is stirred and is described rheologically as being dilatant. It is known to increase the solids content of such a system by adding additional particles of polymer having a smaller size, thereby permitting the voids of the initial system to be filled with smaller particles. An aqueous system containing non-uniform sized particles does not exhibit the tendency to stiffen when stirred. Many attempts have been made to directly produce a latex having a range of particles sizes, as for example by charging the polymerization reactor with the necessary ingredients and withholding all but a small amount of the polymerizable monomer. As the polymerization progresses, the remainder of monomer is charged incrementally throughout the polymerization. This method produces a latex having particles of a relatively uniform and medium size. Another method involves charging all of the polymerization ingredients to the reactor with the exception of the surfactant which in turn is charged incrementally throughout the polymerization. This process tends to produce particles of relatively uniform and large size. Charging all of the ingredients at one time and then carrying out the reaction to completion produces a latex having a relatively uniform particles size distribution and poor viscosity properties.

According to the present invention a very desirable distributon of non-uniform particle sizes is produced when both monomer and surfactant are charged incrementally to the reaction system throughout the reaction period.

The polymerization process of this invention involves the addition of the monomer and the surfactant incrementally to the polymerization system, preferably in at least three increments. Incremental addition of both monomer and surfactant results not only in the production of a latex having a wide distribution of non-uniform size particles, but also results in the use of less surfactant which in turn results in the production of relatively large particle size latex. It has been discovered that control of the distribution of particle sizes is possible by adjusting the proportion of surfactant and monomer added in each increment. With this means of control over particle size distribution, it has been found that good shelf life and mechanical stability at high solids level is obtained. Thus, by the incremental addition of both polymerizable monomer and surfactant, a wide distribution of particle sizes as well as a large average particle size is achieved in a more facile, efficient, and economical manner than has heretofore been possible.

The following control example shows a typical formula for producing a relatively uniform particle size latex, all parts being by weight unless otherwise indicated.

Example 1

Aqueous phase:                          Amount used, parts
  Sodium bicarbonate (buffer) _____  0.25
  Potassium chloride (electrolyte) _____  0.3
  Potassium persulfate (initiator) _____  0.2
  Sodium thiosulfate .5H$_2$O (activator) _____ 0.039
  Water _____    87
Temperature of polymerization, 122° F.

To the above aqueous phase was added vinyl chloride monomer in three portions of 33⅓ parts, each together with the emulsifying agents, Santomerse S (water solution of 30% of sodium decyl benzene sulphonate) and Triton W30 (water solution of 27% of sodium alkylaryl ether sulfate) in amounts of 4.45 parts and 0.5 part, respectively, for the first addition, 2.60 parts and .294 part, respectively, for the second addition, and 2.21 parts and 0.25 part, respectively, for the third addition, each portion having been added at the time the pressure in the reactor started to decrease. The resulting latex had a relatively uniform particle size distribution. This uniform particle size distribution was produced because the amount of surfactant used during each incremental addition was decreased with respect to monomer so as to maintain the amount of surfactant present in the polymerization system proportional to the total surface area of polymer and monomer present at any time throughout the polymerization reaction. Thus, during the polymerization, the particles initially formed were caused to grow throughout the polymerization without promoting the formation of new polymer particles as additional amounts of monomer were added. This latex had 47% solids and 1.3% wet coagulum and an initial Brookfield viscosity of 77 cps. and after aging for seven days set up to a paste.

The following example is typical of a method of producing the improved non-uniform particle size latex of the present invention:

Example 2

Aqueous phase:                      Amount used, parts
  Sodium bicarbonate _____ 0.25
  Potassium chloride _____ 0.30
  Potassium persulfate _____ 0.2
  Water _____  53
Temperature of polymerization, 122° F.

To this aqueous phase was added 33⅓ parts of vinyl chloride monomer together with 2.62 parts of Santomerse S and .32 part of Triton W30. The second increment addition of the same amount of monomer and surfactant was made at the time the pressure in the system started to decrease. The third increment addition of the same amount of monomer and surfactant was made after the pressure produced by the second addition started to decrease. The resulting latex had a non-uniform particle size distribution and a solids content of 61% containing no wet coagulum and an initial viscosity of 26 cps. with no increase in Brookfield viscosity after aging for 13 days and a reduction in Brookfield viscosity to 13 cps. after aging for 33 days. Thus, it has been discovered that a desirable range of particle sizes is produced when the amount of surfactant used during each increment addition of monomer is constant with respect to monomer. In other words, the weight ratio of surfactant to monomer is constant and tends to produce a constantly increasing ratio of amount of surfactant to polymer surface area since the surface area increases by the square of the diameter and the volume increases by the cube of the diameter. However, the system tends to balance itself under these conditions by forming a certain amount of new polymer particles from the new monomer added because of the excess surfactant added with the new monomer, and the remainder of the new monomer goes to increase the size of the particles presently formed. The ratio of surfactant to monomer may range from .1 to 5 parts per 100 parts of monomer.

In addition to producing the improved latex of this invention by means of the incremental addition of monomer and surfactant in a constant ratio as described in Example 2 above, it has also been observed that even higher solids latex having low viscosity may be produced by the incremental addition of monomer and surfactant where surfactant is added in an increasing weight ratio of surfactant to monomer. The following polymerization formula is typical:

*Example 3*

| Ingredient reacted: | Amount used, parts |
|---|---|
| Sodium bicarbonate | 0.25 |
| Potassium chloride | 0.3 |
| Potassium persulfate | 0.2 |
| Water | 36.7 |

Temperature of polymerization, 122° F.

To this polymerization system was added vinyl chloride monomer in three equal portions of 33⅓ parts each with increasing amouts of surfactant with each addition. Two and nine hundredths (2.09) parts of Santomerse S together with 0.25 part of Triton W30 was added with the first increment of vinyl chloride monomer. When the pressure in the polymerization system started to decrease, the second portion of vinyl chloride monomer was added together with 2.62 parts of Santomerse S and 0.32 part of Triton W30 or in an amount of 1.246 times more surfactant than was added initially. The polymerization was permitted to proceed until the pressure in the reaction vessel started to decrease at which time the third increment of vinyl chloride monomer together with 3.16 parts of Santomerse S and 0.38 part of Triton W30 was added or in an amount of 1.21 times more surfactant than was added during the increment addition immediately preceding this addition. The resulting latex had a solids content of 67.5% and an initial viscosity of 81 cps. which, after five days aging, had a Brookfield viscosity of 34 cps.

It is theorized that the superiority of the non-uniform particle size latices produced in Examples 2 and 3 above is due to the fact that in a non-uniform latex the particles can fit together with the small particles occupying the space between the larger particles, thereby permitting a rolling of the particles over each other as the body of latex is disturbed either by pouring or stirring. When the particles of latex are more uniform in size there is a tendency for the particles to lock in their attempt to roll over each other as the body of latex is disturbed. Also, unexpectedly, electronmicrographs of the non-uniform latices produced in Examples 2 and 3 show a larger volume to surface ratio of the polymer particles than is shown for the latices produced in Example 1. Thus, the average diameter ($D_{vs}$) of the particles produced in Example 1 is .09 micron and the average diameter ($D_{vs}$) of the particles produced in Example 2 is .14 micron. $D_{vs}$ is the diameter of the particle having the average volume to surface ratio.

Thus, from the examples above, it has been shown that a vinyl chloride polymer latex having a high solids content of at least 50% and as high as from 60 to 70% may be made in an aqueous emulsion when additional surfactant and monomer are made available to the polymerization system always in at least the same ratio of surfactant to monomer initially employed and not greater than about 1.25 times the ratio of surfactant to monomer added immediately prior to the addition under consideration and within a surfactant to monomer ratio ranging from about 0.1 to 5 per 100 parts of total monomer present.

Although the present invention is particularly adapted to the manufacture of polyvinyl chloride, other polymerizable materials may be used which are polymerizable in an emulsion system using the increment addition of both monomer and surfactant in accordance with the present invention. Examples of such polymerizable materials are styrenes, esters of acrylic acids, vinyl pyridine, vinyl esters of alkanoic acids, butadienes-1,3, and mixtures thereof. There may also be included in the emulsion of polymerizable monomers up to 10% by weight of polymerizable material of acrylonitrile, acrylic acids (including alkacrylic acids), and acrylamides (including alkacrylamides). Examples of the styrenes referred to above are styrene itself (vinyl benzene), alphamethyl styrene, p-methyl styrene, p-chlorostyrene, dichlorostyrenes. Examples of the esters of acrylic acid referred to above are the alkyl esters of acrylic acid and alkacrylic acids, e.g. methyl acrylate, methyl methacrylate, methyl ethacrylate, ethyl acrylate, ethyl methacrylate, ethyl ethacrylate. Examples of the vinyl esters of alkanoic acids referred to above are the various vinyl alkanoates, e.g. vinyl formate, vinyl acetate, vinyl propionate, vinyl butyrate.

The ratio of monomer to water that may be used may vary over a wide range depending upon the solids desired in the resulting latex. However, for a given amount of water the initial charge of both monomer and surfactant may be determined independently of the amount of water present. It is desired to carry out the polymerization reaction under conditions where at least three increment additions of monomer and surfactant are to be used but increment additions beyond this number will still produce the same desirable effect with regard to the high solids latex having a low initial viscosity and a relatively long shelf life.

Any suitable surfactant may be used in the process of this invention, including such soaps as sodium stearate, sodium oleate, ammonium oleate, potassium palmetate, sodium myristate, rosin, or dehydrogenated rosin soaps; such dispersing agents as gelatin, soluble starch, gum tragacanth, gum acacia, gum tragon, water-soluble glycol cellulose, sodium alginate, agar-agar, glue, and Turkey red oil; such emulsifiers as the sodium salts of alkyl substituted aromatic sulfonic acids, particularly decyl benzene sulfonic acid, the sodium salts of reaction products of fatty acids of high molecular weight, and hydroxy substituted or amino substituted alkyl sulfonic acids. These surfactants may be used in concentrations ranging from 0.1 to 5% of the monomer present and the most economical amounts are those employing sufficient surfactant to bring about the most desirable dispersion of the monomer in the liquid phase, particularly when water is used as the liquid phase.

Any of the various polymerization catalysts known to be suitable for use in polymerizing olefinically unsaturated monomers and soluble in a liquid system, particularly in an aqueous medium, can be employed. Particularly desirable are the radical-yielding initiators and especially those soluble in water, such as hydrogen peroxide, sodium or potassium persulfate, percarbonate, or perborate, and peracetic acid. About 0.01 to 5% of initiator or catalyst is to be used in the polymerization system.

The temperature of operation in the process of the invention will vary over considerable limits depending for best results on the particular polymerizable monomer being polymerized. Thus, the temperature limits may be as low as 15° C. and in extreme cases as high as about 150° C. Ordinarily temperatures from about 20° C. to 80° C. are employed.

The manner of stirring may take many forms, as for example with respect to the shape of the blade fashioned to bring about mixing or agitation of the phases of the polymerization system, and of course the speed at which the particular blade being used is rotated or moved through the system.

The advantages of the high solids latex of this invention are observed in its increased shelf life and fluidity at relatively high solids content. The high solids latex of this invention is admirably adapted for such uses as rug backing, paper coating, fabric coating, film casting, dip goods, and similar uses.

While certain representative embodiments and details have been shown for the purpose of illustrating the invention, it will be apparent to those skilled in this art that various changes and modifications may be made therein without departing from the spirit or scope of the invention.

What is claimed is:

1. The method of effecting the aqueous emulsion polymerization of polymerizable organic monomers containing a single olefinic double bond and comprising primarily vinyl chloride, which comprises polymerizing a portion of the total polymerizable monomers to be converted to polymer in the presence of a surfactant for dispersing said monomers in water and an initiator of polymerization of said monomers, the weight ratio of said surfactant to said monomers ranging from 0.1 to 5 parts per 100 parts of total monomers present throughout the remainder of the polymerization reaction adding additional surfactant and additional polymerizable monomers to said polymerization reaction at least in the same ratio and not greater than 1.25 times the ratio of surfactant to monomer added immediately prior to the present addition to produce a constantly increasing ratio of amount of surfactant to polymer surface so as to bring about the formation of new polymer particles and the continued growth of the polymer particles formed during the initial polymerization reaction and recovering the latex containing at least about 61% solids.

2. The method of claim 1 in which the ratio of surfactant added to monomer added is the same as the ratio of surfactant to monomer initially charged.

3. The method of claim 1 in which the surfactant is a soap.

4. The method of claim 1 in which the surfactant is a dispersing agent.

5. The method of claim 1 in which the surfactant is a sodium salt of an alkyl substituted aromatic sulphonic acid.

6. The method of claim 1 in which the surfactant is sodium decyl benzene sulphonate.

7. The method of claim 1 in which the surfactant is a mixture of sodium decyl benzene sulphonate and sodium alkylaryl ether sulphate.

References Cited by the Examiner

UNITED STATES PATENTS

| | | | |
|---|---|---|---|
| 2,494,002 | 1/1950 | Rumbold | 260—29.7 |
| 2,520,959 | 9/1950 | Powers | 260—29.6 |
| 2,771,457 | 11/1956 | Barnes et al. | 260—29.6 |
| 2,993,020 | 7/1961 | Carpenter | 260—29.7 |

MURRAY TILLMAN, *Primary Examiner.*

LEON J. BERCOVITZ, *Examiner.*